Patented July 24, 1934

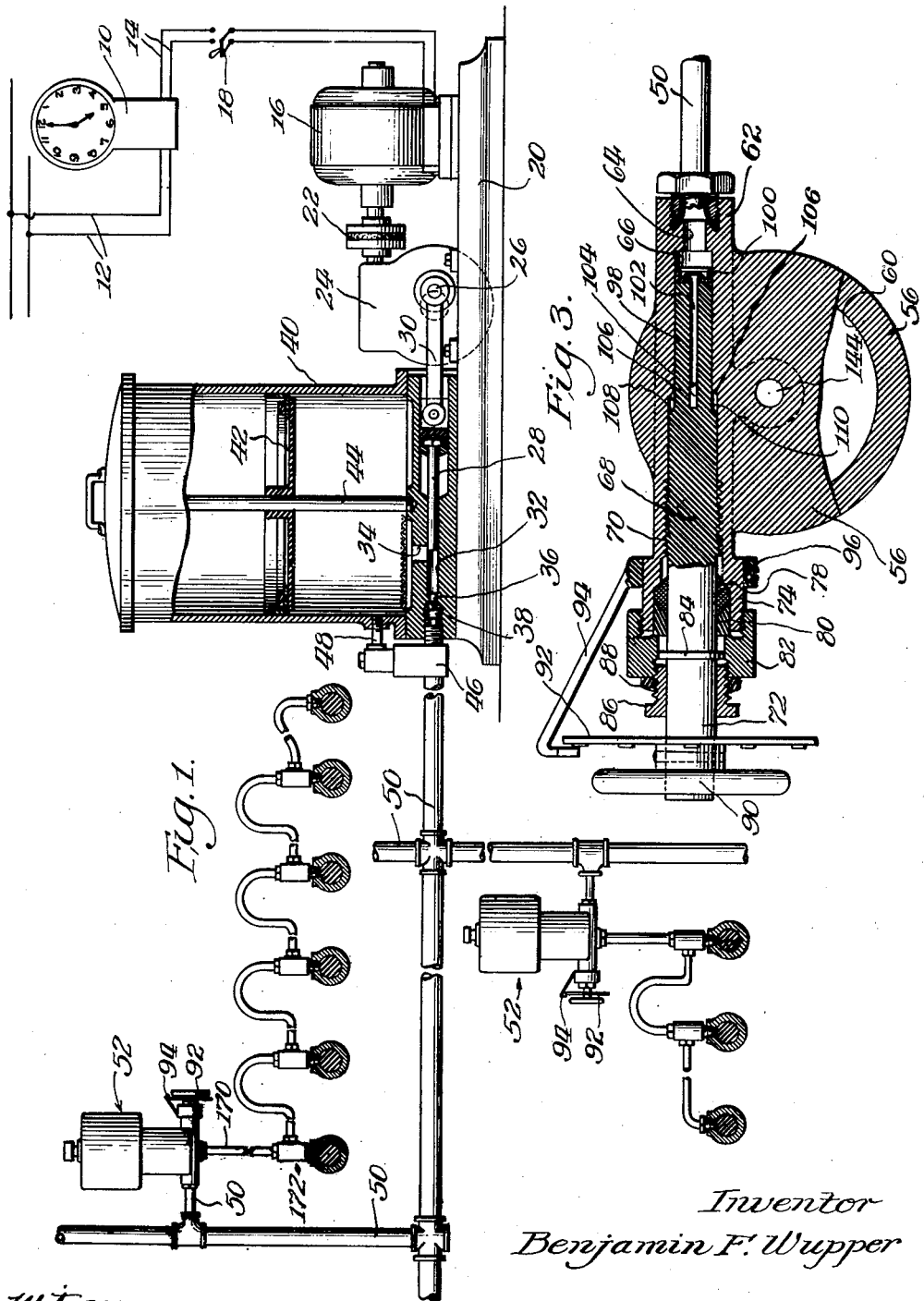

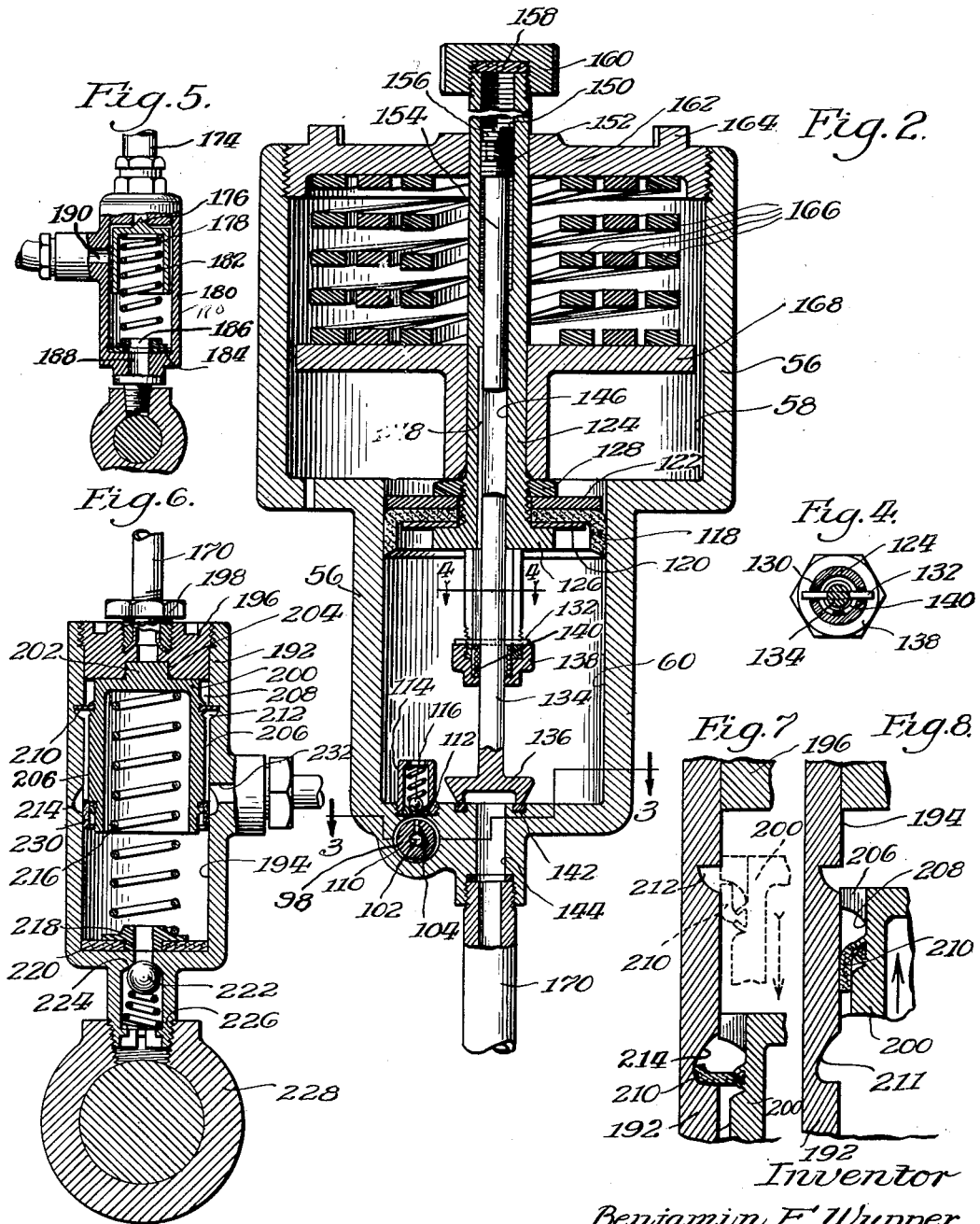

1,968,000

UNITED STATES PATENT OFFICE 1,968,000

LUBRICATING SYSTEM

Benjamin F. Wupper, Chicago, Ill., assignor to Alemite Corporation, Chicago, Ill., a corporation of Delaware Application August 24, 1928, Serial No. 301,810

10 Claims. (Cl. 184—7)

My invention relates, generally, to lubricating systems for lubricating a large number of bearings from a single source of lubricant under pressure.

It is an object of my invention to provide improved means for distributing lubricant among a plurality of bearings.

Another object is to provide an improved system of supplying lubricant to a number of bearings in which certain bearings are lubricated periodically at fixed intervals of time, while other bearings of the system are lubricated periodically at different intervals.

A further object is to provide an improved periodically operating lubricant measuring device.

A further object is to provide an improved measuring valve.

A further object is to provide an improved method of lubricating large numbers of bearings.

Other objects will appear from the following description, reference being had to the accompanying drawings, in which Figure 1 is a diagrammatic view of a substantially complete system of my invention;

Figure 2 is a central vertical section of the periodically operating measuring device;

Figure 3 is a horizontal section taken on a line 3—3 of Figure 2;

Figure 4 is a similar section taken on a line 4—4 of Figure 2;

Figure 5 is a central vertical section of a measuring device used in the system;

Figure 6 is a central vertical section of my improved measuring device; and

Figures 7 and 8 are fragmentary views of the measuring valve shown in Figure 6, illustrating the parts in different operative positions.

Referring to Figure 1, the system of my invention comprises, generally, a circuit closing clock 10, connected by conductors 12 to a suitable source of electric power and having conductors 14 leading to a motor 16, the circuit through the conductors 14 being adapted to be broken by a double pole switch 18. The clock 10 may be of any suitable construction which is capable of periodically connecting the conductors 14 with the conductors 12 for short intervals of time.

The motor 16 is mounted on a base 20 and is connected by suitable flexible coupling 22 to a worm and gear speed reduction mechanism mounted in the housing 24. The worm wheel drives a crank 26 which is operatively connected to a plunger 28 by a connecting rod 30. The plunger 28 operates in a cylinder 32 having an inlet port 34 and an outlet port 36 which is normally closed by a check valve 38.

Lubricant is carried in a suitable container 40, the lubricant being forced toward the inlet port 34 by a suitable follower 42, slidable upon a rod 44.

A suitable pressure regulator 46 is connected to the discharge end of the cylinder 32, having a pipe 48 connected to the reservoir 40 to permit return flow to the reservoir when the pressure of the discharge from the pump exceeds a predetermined maximum. The regulator 46 is connected by suitable piping 50 to periodically operating measuring devices 52. While only two of these devices are illustrated in the drawings, it will be understood that practically any number desired may be connected to the piping 50. In normal practice one of these devices 52 will be suitably mounted adjacent a machine to be lubricated or adjacent a group of bearings of a large machine. The system is adapted to be installed in shops and factories where there are a large number of machines whose bearings require lubrication periodically. In such shops and factories the bearings of some machines are preferably lubricated every four hours, others every eight hours and still others every 16, 24, etc. hours of use. The periodical measuring devices 52 are designed for the purpose of making possible the lubrication of the different machines at different intervals as above mentioned.

The periodically operating measuring device comprises a body casting 56 having two cylindrical chambers 58 and 60. As shown in Figure 3, the piping 50 is connected by a suitable union to a boss 62 formed on the casting 56 and communicates through an inlet port 64 with a cylinder 66. A valve member 68 is threaded into the body 56 at 70 and has a stem 72 which is sealed in a boss 74 integral with the casting 56 by a packing 78, packing gland 80 and stuffing box nut 82.

The stem 72 has an annular projection 84 which is adapted to contact with the packing gland 80 and thus limit its inward movement and to abut the inner end of a bushing 86 which is threaded in the stuffing box nut 82 and may be locked in adjusted position by a nut 88. The outer end of the stem has a handle 90 and an indicator dial 92 secured thereto. A pointer 94 is adapted to be fixed to the boss 74 by a set screw 96.

The valve member 68 has a reduced inner end portion 98 which carries a cup leather 100 at its extremity, the cup leather being adapted to form a seal between the portion 98 and the cylinder 66. The portion 98 has an axial bore 102 which communicates with a radial valve port 104 which co-operates with a valve seat 106. It will thus be seen that by screwing in the valve member 68 the effective size of the port 104 may be varied. When the valve member is screwed inwardly to its farthest position, a tapered shoulder 108 thereon engages the seat 106 and entirely closes the valve. Lubricant may normally flow from the piping 50 through the inlet port 84, cylinder 66, bore 102, port 104, into an annular space 110 formed around the reduced portion 98. The space 110 has a port 112 (Figure 2) which is formed at the lower end of a cage 114 which is threaded in the casting 56 directly above the space 110. The port 112 is normally closed by a spring pressed check valve 116.

A suitable face plate 120 and backing plate 122 are carried by a hollow stem 124, being clamped against a shoulder 126 thereof by a nut 128. The lower end of the hollow stem 124 has a diametrical slot 130 which is adapted to guide a pin 132 carried by a stem 134 formed integrally with an outlet valve 136. A cap nut 138 is threaded over the lower end of the stem 124 and forms a seat for one end of a compression spring 140, the other end of which abuts against the pin 132.

The valve 136 normally rests in contact with a gasket 142 surrounding a discharge orifice 144 formed in the lower end of the casting 56. The stem 134 is guided within the hollow bore 146 of the stem 124. A longitudinal groove 148 extends along part of the length of the bore 146.

The upper end of the stem 124 is internally threaded at 150 and is adapted to receive the threaded head portion 152 of a regulating pin 154. The head 152 preferably has a hexagonal recess therein adapted to receive a suitable tool whereby it may be turned. The pin 154 is adapted to be clamped in set position by a threaded shell 156 which has a suitable kerf to receive a screwdriver and acts as a lock nut against the head 152. The upper extremity of the stem 124 is closed by a gasket 158 which is clamped over the end by a cap nut 160. The upper end of the stem 124 is guided in a cap 162 which has suitable lugs 164 whereby it may be turned into the threaded upper end of the cylinder 58. A plurality of compression springs 166 are confined between the cap 162 and a flanged collar 168, the lower end of which rests upon the nut 128.

The discharge orifice 144 of the periodical measuring device is connected by a suitable conduit 170 with a plurality of bearings to be lubricated. In the system shown, I have utilized a plurality of progressively operating measuring valves which are adapted to distribute the lubricant discharged from the periodical device 52 to the various bearings in proper proportions. However, any suitable system may be utilized, properly to distribute the charge from the device 52 to the various bearings of the group associated with the particular device 52. Such means as flow resistance units, measuring valves connected in parallel, etc., may be used in place of the progressively operating measuring valves illustrated in the drawings.

In Figure 1 I have shown a conduit 170 connected to a progressively operating measuring valve 172. This valve is shown in section in Figure 5 and comprises an inlet port 174 which is normally closed by the conical head 176 of a piston valve 178 which is reciprocable within a cylinder 180. The piston valve 178 is normally held with its conical head 176 closing the inlet port 174 by a spring 182 which rests upon a gasket 184, a ring 186 serving to hold the lower end of the spring in central position. Upon lubricant pressure impulse the piston valve 176 will be forced downwardly, compressing the spring 182 and forcing lubricant from beneath the piston valve 178 through a discharge port 188 to the bearing to be lubricated. As the piston valve approaches its lowermost position it uncovers an outlet port 190 leading to the next measuring valve of the series.

The above described measuring valve, which is shown in Figure 5 of the drawings, is more fully described and claimed in the co-pending applications of Ernest W. Davis, Serial No. 219,837, filed September 16, 1927, and Serial No. 232,550, filed November 11, 1927.

The measuring valve shown in Figures 6, 7 and 8 may be substituted for the previously described measuring valve of Figure 5. This valve comprises a cylindrical body 192 having a cylinder 194 formed therein and the upper end of which is closed by a cap 196 which is threaded to receive a suitable connection fitting 198 for attaching the conduit 170. A valve member 200 is slidably mounted in the cylinder 194 and has a cylindrical end portion 202 which normally rests in a recess 204 formed in the cap 196. The valve member 200 has a plurality of longitudinal grooves 206 formed in its outer surface and has a circumferential groove 208 formed therein. A pliable and resilient ring-shaped sealing member 210 has its inner edge securely fastened at the base of the annular groove 208.

The sealing member 210 is adapted to bend upwardly, as shown in dotted lines in Figure 7, upon the downward stroke of the member 200 and to bend downwardly, as shown in Figure 8, upon the upward stroke of the member 200. Suitably shaped annular grooves 212 and 214 are formed in the cylinder 194 to permit reversal of the sealing member 210 at the ends of its stroke.

The member 200 is normally held in its uppermost position by a spring 216, the lower end of which is seated upon a retainer 218 which rests upon a gasket 220 at the lower end of the cylinder 194. The lower end of the passageway through the retainer 218 and the end of the body 192 is normally closed by a spring pressed ball check valve 222 which seats against a shoulder 224. The lower end of the body 192 is externally threaded at 226 so as to be adapted to be screwed into the customary oil hole of a bearing 228.

The lower end of the member 200 has a cup leather 230 crimped thereto which is adapted to prevent flow of lubricant through the grooves 206 upon the downward stroke of the member 200. An outlet port 232, formed in the side of the body 192, is adapted to be uncovered when the member 200 is at the end of its downward stroke and is adapted to be connected by a suitable conduit to the next measuring device of the series.

The operation of the above described system of lubrication is as follows: The clock 10 is set so as to complete a circuit to the conductors 14 for a short time at periodic intervals. For example, it may be adjusted so as to close the circuit to the conductors 14 for a period of thirty seconds at intervals of one hour. Thus, the motor driven compressor will operate for a short time at periodical intervals to supply lubricant under a predetermined pressure, controlled by the regulating valve 46, to the piping 50 and hence to the periodical measuring devices 52.

As the lubricant pressure is "on" for only a relatively short time, a comparatively large valve port 104 will be used, thereby making it possible to use comparatively heavy greases as lubricants, since it is a well known fact that lubricant such as greases cannot be forced through minute orifices except at entirely impractical high pressures. Thus, whenever the lubricant pressure is on, lubricant will flow past the check valve 116 into the cylinder 60 and will gradually raise the cup leather 118 and its stem 124 upwardly against the compression of the springs 166. During this upward movement of the stem 124 the valve 136 will remain upon its seat due to the pressure of lubricant in the cylinder 60, and the spring 140 will be compressed gradually. After sufficient lubricant has been supplied to the device 52 to raise the cup leather and stem 124 substantially to the position shown in Figure 2, further supply of lubricant to the cylinder 60 will, through contact of the pin 132 with the cap nut 138, cause the valve 136 to be raised from its gasket seat 142. After this valve has been "cracked" open, the spring 140 will raise the valve 136 until the upper end of its stem 134 abuts against the lower end of the regulating pin 154. The groove 148 will permit any lubricant which may be entrapped within the bore 146 to flow into the cylinder 60.

After the valve 136 has been raised from its seat the springs 166 will expand, forcing the cup leather piston 118 downwardly to expel lubricant from the cylinder 60 through the discharge orifice 144. Lubricant will thus continue to discharge until the valve 136 is moved downwardly to a position where it again contacts with its gasket seat 142. The quantity of lubricant which may be discharged by the device 52 may be decreased by screwing the regulating pin 154 inwardly or increased by screwing the pin 154 outwardly.

The rate of admission of lubricant to the cylinder 60 may, of course, readily be varied by adjustment of the valve member 68 or any one of the devices 52 may be rendered inoperative by screwing in the member 68 until its shoulder 188 contacts with the seat 106. The indicator dial 92, with its pointer 94, serves as a convenient means to aid in repositioning the valve at any desired degree of opening.

Assuming that the progressive measuring valves shown in Figure 5 are connected in series with the discharge conduit 170 of the device 52, as shown in Figure 1, the lubricant flowing from the conduit 170 will force downwardly the piston valve 178 of the first measuring valve of the series and discharge lubricant from its cylinder 180 to the adjacent bearing and thereafter uncover the outlet port 190 to permit flow of lubricant from the conduit 170 through the first measuring valve 172 to the next measuring valve 172 of the series. The remaining measuring valves 172 of the series will operate seriatum in the same manner as the first valve. It is not necessary to connect a measuring valve 172 to the last bearing of the series, since the quantity of lubricant discharged by the device 52 may be regulated so that it will be equal to the total capacity of the measuring valves 172 of the series plus the amount of lubricant required for the last bearing of the series.

The principle of the operation of the measuring valve shown in Figures 6, 7 and 8 is substantially the same as the operation of the valve shown in Figure 5, the operation of the former differing merely in detail. As the lubricant is supplied to the conduit 170 (Figure 6) it will exert downward pressure upon the cylindrical projection 202 and force the member 200 downwardly. During the initial part of this downward movement a partial vacuum will tend to be created at the upper end of the cylinder 194 above the flexible sealing member 210 which will tend to bend the sealing member upwardly (shown in dotted lines in Figure 7) if it has not already taken this position. The sealing member 210 is of sufficient resiliency so that it will normally take the position shown in Figure 6 when the member 200 is at rest at the upper end of its stroke, and at the initial downward movement of the member 200, the conformation of the groove 212 will tend to cup the member 210 upwardly. Upon continued flow of lubricant to the measuring valve, the member 200 will move downwardly, compressing the spring 216. During this downward movement the member 210 will prevent flow of lubricant between the member 200 and the walls of the cylinder 194.

When the member 200 approaches its lowermost position, the member 210 will uncover the outlet port 232, permitting flow of lubricant to the next measuring valve of the series. Since, however, it requires higher lubricant pressure to overcome the force of the spring 216 of the second measuring valve of the series than is required to continue downward movement of the member 200 to the end of its stroke (due to the difference in area of the projection 202 and the cross sectional area of the cylinder 194), the member 200 will move to its lowermost position where its lower end abuts against the gasket 220 and the sealing member 210 will be free to extend outwardly in the groove 214 and form a seal to prevent flow of lubricant from the upper end of the cylinder 194 to the lower end thereof.

After the series of measuring valves have been completely operated and the valve 136 of the periodically operable measuring device 52 again closed, the pressure in the conduits 170 and in the measuring valves will gradually be dissipated through very slight leakages in the system and the spring 216 of each of the measuring valves will thereupon force its valve member 200 upwardly, whereupon the lubricant in the upper end of the cylinder will be forced to the lower end of the cylinder. During the upward movement of the member 200 the sealing member 210 will take the position shown in Figure 8, in which position it will readily permit the above described flow of lubricant. As the cylindrical projection 202 enters its recess 204 the upward movement of the member 200 will be retarded, but since there is slight clearance between the projection 202 and its recess 204, the upward movement of the member 200 will not be completely arrested. As the member 200 approaches its uppermost position the sealing member 210 will again spread out to its normal position as shown in Figure 6.

From the above description of the operation of my improved system of lubrication it will be apparent that I have provided a system which is operative with heavy oils and greases, which may be applied to lubricate practically any number of bearings, in which the frequency of lubrication of any particular group of bearings may be readily varied as desired, which is very flexible so that it may readily be adapted to any particular group of machines having different lubrication requirements, and which is entirely automatic in operation.

While I have illustrated a particular embodiment of my invention and have described the preferred arrangement of the system and mode of operation, it will be apparent to those skilled in the art that numerous modifications of the elements of the system and operation of the system as a whole may readily be made without departure from the principles of my invention. I therefore do not restrict myself in any unessential particulars, but what I claim and desire to secure by Letters Patent is:

1. In a lubricating system of the class described, the combination of a plurality of groups of bearings, a single source of lubricant, an intermittently operable lubricant compressor, conduits connecting said compressor with said bearings, and automatically operable means associated with each group of bearings to control the frequency of lubrication of each group of bearings independently of the other groups.

2. In a lubricating system of the class described, the combination of a plurality of groups of bearings, measuring devices associated with said bearings, periodically operable measuring means associated with each group of bearings and adapted to supply lubricant to the measuring devices of one group, a source of lubricant periodically under pressure and connected to said measuring means, and means to regulate the rate of flow of lubricant to said measuring means thereby to control the frequency of its operation.

3. In a lubricating system of the class described, the combination of a plurality of groups of bearings, a source of lubricant periodically placed under pressure, conduits connecting said source with said bearings, and automatically operable means intermediate said source and said bearings and each associated with a group of bearings to control the frequency of lubrication of said group independently of the other groups.

4. A periodically operating constant volume discharge device comprising a body having a measuring chamber, an inlet and an outlet passageway in said body for supplying fluid to and conveying fluid from said chamber, means to regulate the size of the inlet passageway, a valve normally closing the outlet passageway, a movable resiliently held member constituting one of the walls of said chamber, and means connecting said member and said valve to open the valve upon a predetermined movement of said member.

5. A periodically operating constant volume discharge device comprising a body having a measuring chamber, an inlet and an outlet passageway in said body for supplying fluid to and conveying fluid from said chamber, means to regulate the size of the inlet passageway, a valve normally closing the outlet passageway, a movable resiliently held member constituting one of the walls of said chamber, and a lost motion connection between said member and said valve.

6. A periodically operating constant volume discharge device comprising a body having a measuring chamber, an inlet and an outlet passageway in said body for supplying fluid to and conveying fluid from said chamber, means to regulate the size of the inlet passageway, a valve normally closing the outlet passageway, a movable resiliently held member constituting one of the walls of said chamber, a positive lost motion connection between said member and said valve, and a spring tending to move said valve with said member.

7. A periodically operable constant quantity fluid discharge device, comprising a cylinder having an inlet and an outlet at one end thereof, a source of fluid pressure, means to control the rate of flow of fluid from said source to said cylinder, a piston in said cylinder, resilient means to force said piston toward the outlet end of said cylinder, a valve normally closing said outlet, a connection to open said valve when said piston has moved a predetermined distance away from the outlet end of the cylinder, and adjustable means to limit the movement of said piston toward the outlet end of said cylinder.

8. A periodically operable constant quantity fluid discharge device, comprising a cylinder having an inlet and an outlet at one end thereof, a source of fluid pressure, means to control the rate of flow of fluid from said source to said cylinder, a piston in said cylinder, resilient means to force said piston toward the outlet end of said cylinder, a valve normally held closing the outlet by the fluid pressure within said cylinder, and a connection between said valve and piston whereby the valve will serve as a stop to limit movement of said piston by the force of said resilient means and the piston force said valve to closed position.

9. A lubricating system comprising a source of lubricant, pumping means supplied by said source, control means to cause operation of said pumping means at predetermined regular intervals for limited periods, and a plurality of lubricant measuring devices connected to the discharge port of said pump, each of said devices comprising means to control the rate of lubricant flow from said pumping means to the device, means to store the lubricant under pressure, and means to discharge the lubricant after a predetermined quantity of lubricant has been stored.

10. In a lubricating system, the combination of a source of lubricant, a pump supplied with lubricant from said source, power means for operating said pump, a plurality of groups of parts to be lubricated, a plurality of lubricant accumulating devices one for each of said groups, conduit means connecting the discharge port of said pump with said devices, each of said devices having means for regulating the frequency and extent of its operation, automatic means for causing periodic operation of said power means, and manually operable means for rendering said automatic means inoperative.

BENJAMIN F. WUPPER.